United States Patent
Dasamaneni et al.

(10) Patent No.: US 8,615,006 B2
(45) Date of Patent: Dec. 24, 2013

(54) SYSTEMS AND METHODS FOR RECONFIGURATION OF A CIRCUIT SWITCHED RING TO A PACKET SWITCHED RING

(75) Inventors: Shyam Kumar Dasamaneni, Andhra Pradesh (IN); Pravin Murugesh Lingayath, Karnataka (IN)

(73) Assignee: Fujitsu Limited, Kawasaki-shi (JP)

( * ) Notice: Subject to any disclaimer, the term of this patent is extended or adjusted under 35 U.S.C. 154(b) by 213 days.

(21) Appl. No.: 13/096,864

(22) Filed: Apr. 28, 2011

(65) Prior Publication Data

US 2012/0275785 A1    Nov. 1, 2012

(51) Int. Cl.
*H04L 12/66*    (2006.01)

(52) U.S. Cl.
USPC .......................................................... 370/355

(58) Field of Classification Search
USPC .................. 370/352–356, 216–217, 221–224
See application file for complete search history.

(56) References Cited

U.S. PATENT DOCUMENTS

| | | | | |
|---|---|---|---|---|
| 5,042,031 A * | 8/1991 | Yokoyama et al. | ........... | 370/223 |
| 5,257,259 A * | 10/1993 | Tsurumi | ........................ | 370/354 |
| 6,049,523 A * | 4/2000 | Anderson et al. | ............. | 370/217 |
| 6,616,350 B1 * | 9/2003 | de Boer et al. | ..................... | 398/9 |
| 7,460,783 B2 * | 12/2008 | Fumagalli et al. | ................ | 398/5 |
| 7,509,438 B1 * | 3/2009 | Lu et al. | ........................ | 709/251 |
| 7,668,084 B2 * | 2/2010 | Driscoll et al. | ............... | 370/227 |
| 7,778,159 B2 * | 8/2010 | Driscoll et al. | ............... | 370/217 |
| 7,826,400 B2 * | 11/2010 | Sakauchi | ...................... | 370/258 |
| 8,203,932 B2 * | 6/2012 | Cheung et al. | ................ | 370/216 |
| 8,467,375 B2 * | 6/2013 | Blair | ............................. | 370/351 |
| 2004/0179471 A1 * | 9/2004 | Mekkittikul et al. | ......... | 370/218 |
| 2006/0120354 A1 * | 6/2006 | Sohn et al. | .................... | 370/352 |
| 2009/0180472 A1 * | 7/2009 | Lometti et al. | ................ | 370/389 |
| 2010/0271935 A1 * | 10/2010 | Allasia et al. | ................. | 370/222 |
| 2010/0278040 A1 * | 11/2010 | He et al. | ........................ | 370/222 |

* cited by examiner

*Primary Examiner* — Mark Rinehart
*Assistant Examiner* — Kenneth P Hunt
(74) *Attorney, Agent, or Firm* — Baker Botts L.L.P.

(57) ABSTRACT

In accordance with embodiments of the present disclosure, a method for reconfiguration of a circuit-switched ring network to a packet-switched ring network is provided. The method may include, for each adjacent pair of network elements in a network bridging traffic between the pair of network elements via a second path other than a first circuit switched-based path directly coupling the pair. The method may also include provisioning packet switched-based network interfaces on each of the pair of network elements. The method may additionally include establishing a packet switched-based path directly between the packet switched-based network interfaces. The method may further include switching traffic from the first path to the packet switched-based path.

16 Claims, 3 Drawing Sheets

SYSTEMS AND METHODS FOR RECONFIGURATION OF A CIRCUIT SWITCHED RING TO A PACKET SWITCHED RING

TECHNICAL FIELD

This disclosure relates generally to the field of communications systems and more specifically to reconfiguration of a circuit switched ring to a packet switched ring.

BACKGROUND

A communication network may include network elements that route packets through the network. Today, many communications networks are implemented as circuit switched networks, such as Synchronous Optical Networking (SONET) networks, for example. In general, SONET may be described as a standardized multiplexing protocol for transferring multiple digital bit streams over optical fiber using lasers or light-emitting diodes (LEDs). In addition, communications networks may be implemented as packet switched networks, such as Ethernet networks, as an example. In general, a packet-switched network may be a digital communications network that groups all transmitted data, irrespective of content, type, or structure into suitably-sized blocks, called packets. The network over which packets are transmitted is a shared network which routes each packet independently from all others and allocates transmission resources as needed.

Both circuit switched networks and packet switched networks may be organized in ring topologies. A ring network may be a network topology in which each node connects to exactly two other nodes, forming a single continuous pathway for signals through each node—a ring. Data travels from node to node, with each node along the way handling every packet. Optical networks often employ redundancies to maximize performance and availability. In ring networks, such redundancies may include shared ring protection schemes such as bidirectional line switched ring (BLSR). With BLSR, rather than sending redundant copies of packets from ingress to egress, ring nodes adjacent to a failure may reroute traffic in an opposite direction of the ring in response to a failure. For example, if a failure occurs at a first node intermediate to a second node and a third node in which the first node and second node are "counterclockwise" to the third node, third node may reroute traffic intended for the second node in a "clockwise" direction (e.g., via nodes other than the first node).

Some advantages may exist for packet-based ring networks over circuit-switched ring networks. For example, packet-based rings may provide wide-area multipoint connectivity more economically due to their reduced number of links, while also providing ring protection similar to BLSR. Accordingly, it may be beneficial to reconfigure circuit-switched ring networks to packet-based ring networks. However, doing so using traditional approaches may lead to undesired network downtime.

SUMMARY OF THE DISCLOSURE

In accordance with the present disclosure, disadvantages and problems associated with reconfiguration of circuit-switched ring networks to packet-switched ring networks may be reduced or eliminated.

In accordance with embodiments of the present disclosure, a method for reconfiguration of a circuit-switched ring network to a packet-switched ring network is provided. The method may include, for each adjacent pair of network elements in a network, bridging traffic between the pair of network elements via a second path other than a first circuit switched-based path directly coupling the pair. The method may also include provisioning packet switched-based network interfaces on each of the pair of network elements. The method may additionally include establishing a packet switched-based path directly between the packet switched-based network interfaces. The method may further include switching traffic from the first path to the packet switched-based path.

Certain embodiments of the disclosure may provide one or more technical advantages. A technical advantage may be that a network may be reconfigured from a circuit-switched ring network to a packet-switched ring network without network downtime.

Certain embodiments of the disclosure may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION OF THE DRAWINGS

Figure 1:
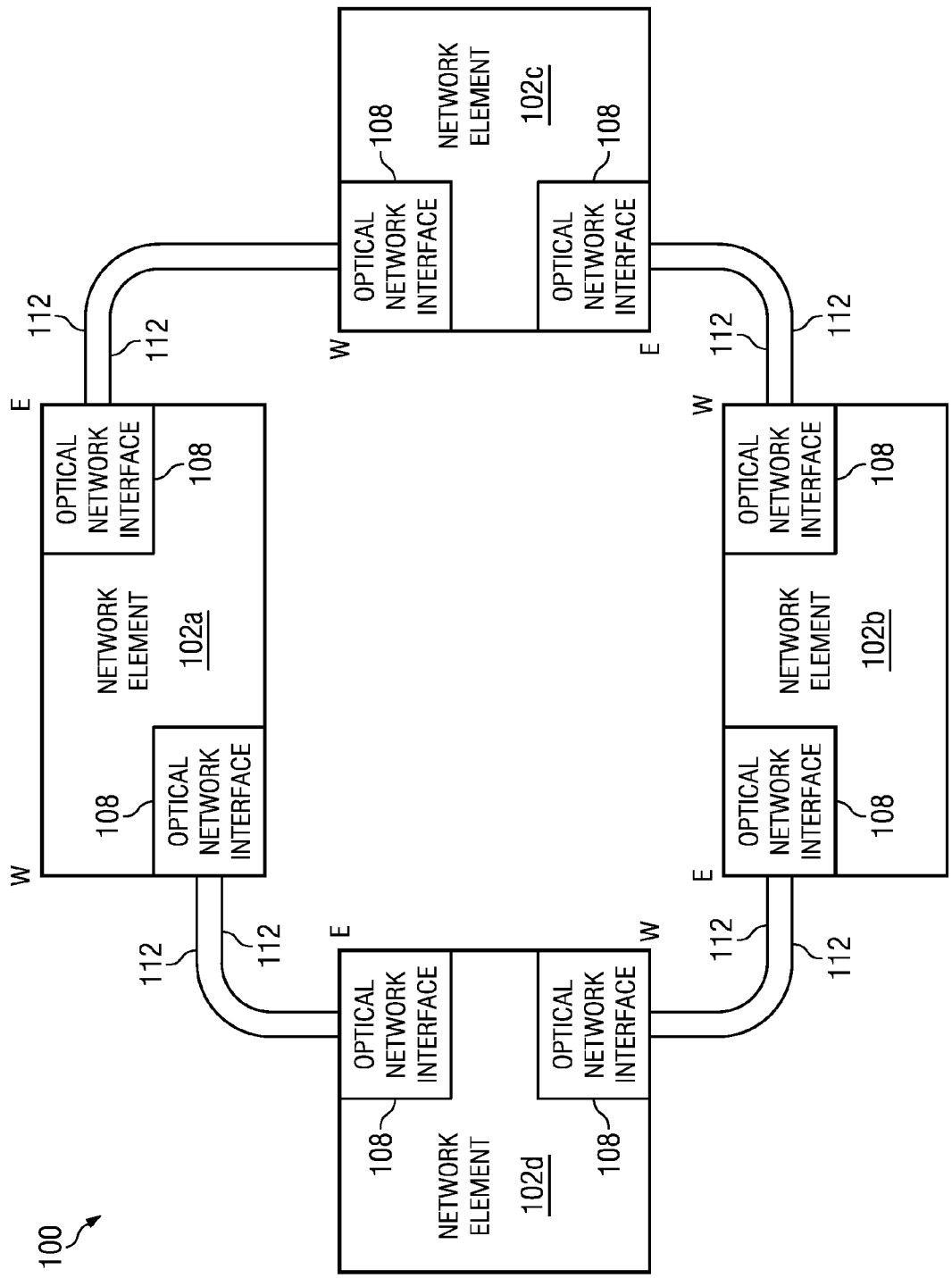
FIG. 1 illustrates a block diagram of an example circuit-switched ring network, in accordance with certain embodiments of the present disclosure.
Figure 2:
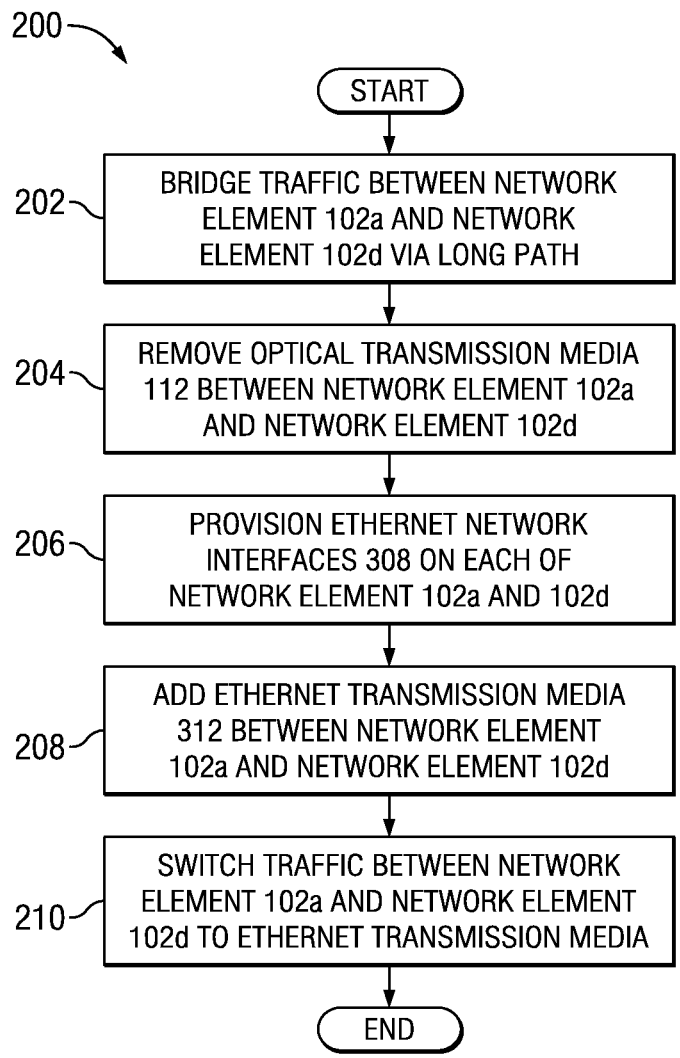
FIG. 2 illustrates a flow chart of an example method for reconfiguring an adjacent pair of network elements of a ring network for communication via packet switching, in accordance with certain embodiments of the present disclosure.
Figure 3:
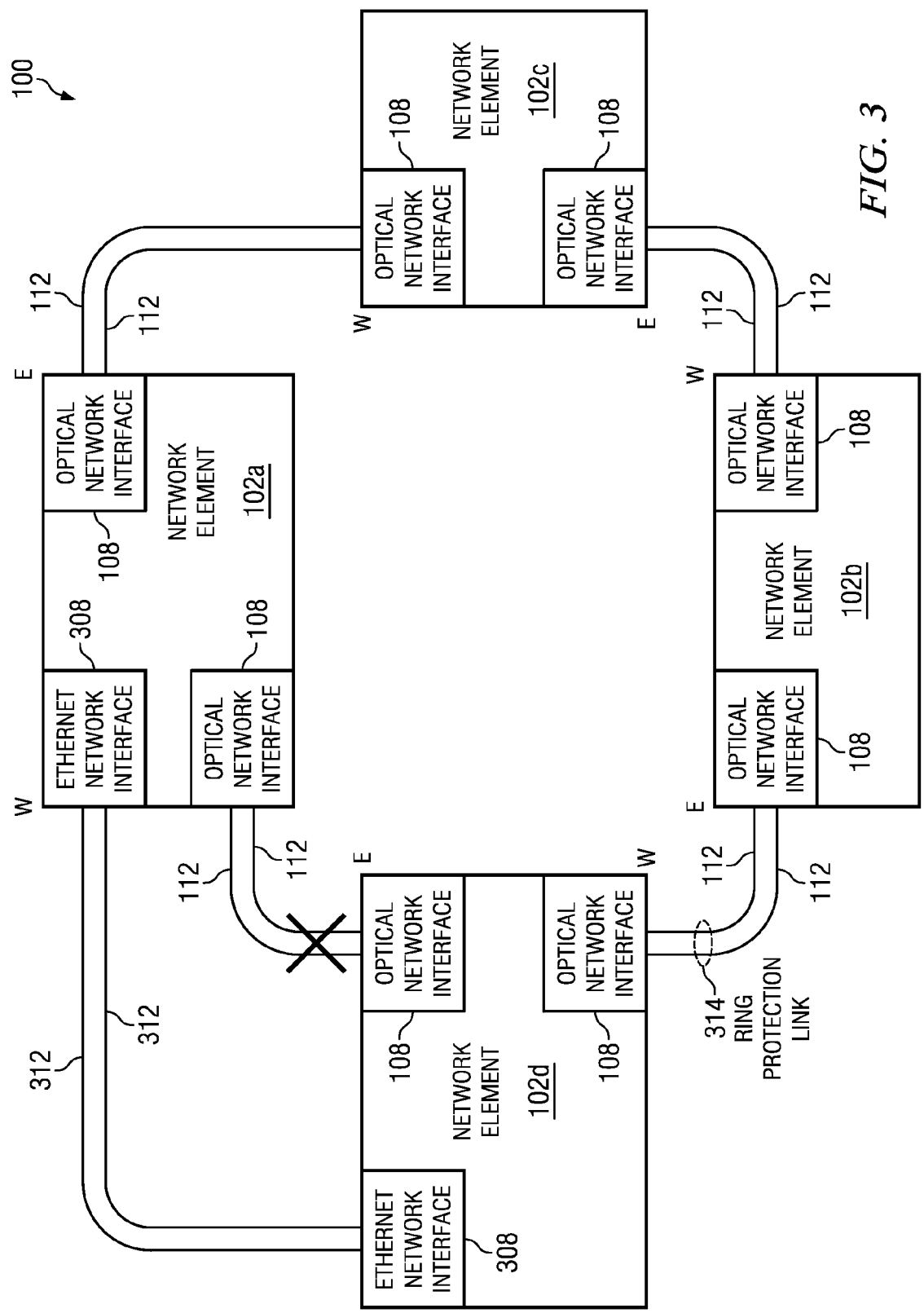
FIG. 3 illustrates a block diagram of the network of FIG. 1 after reconfiguration of an adjacent pair of network elements to communicate via packet switching, in accordance with certain embodiments of the present disclosure.

Embodiments of the present disclosure and its advantages are best understood by referring to FIGS. 1-3, like numerals being used for like and corresponding parts of the various drawings.

FIG. 1 illustrates a block diagram of an example circuit-switched ring network 100, in accordance with certain embodiments of the present disclosure. In certain embodiments, network 100 may be an optical network. Network 100 may include one or more optical transmission media 112 operable to transport one or more signals communicated by components of network 100. The components of network 100, coupled together by transmission media 112, may include a plurality of network elements 102. In the illustrated network 100, network elements 102 may be configured in a ring topology, such that each network element 102 is coupled to two other network elements 102. Network 100 may be used in a short-haul metropolitan network, a long-haul inter-city network, or any other suitable network or combination of networks.

Each transmission medium 112 may include any system, device, or apparatus configured to communicatively couple network devices 102 to each other and communicate information between corresponding network devices 102. For example, a transmission medium 112 may include an optical fiber. An optical fiber comprise any suitable type of fiber, such as a Single-Mode Fiber (SMF), Enhanced Large Effective Area Fiber (E-LEAF), or TrueWave® Reduced Slope (TW-RS) fiber. As shown in FIG. 1, a pair of transmission media 112 may be coupled between adjacent network elements 102, such that network system 100 is configured to allow bidirectional communication between adjacent nodes.

Network 100 may communicate information or "traffic" over transmission media 112. As used herein, "traffic" means information transmitted, stored, or sorted in network 100. Such traffic may comprise optical or electrical signals configured to encode audio, video, textual, and/or any other suitable data. The data may also be real-time or non-real-time. Traffic may be communicated via any suitable communications protocol, including, without limitation, SONET.

Each network element 102 may include one or more circuit switching-based network interfaces. For example, as shown in FIG. 1, each network element 102 may include two optical network interfaces 108. Each network interface 108 may include any suitable system, apparatus, or device configured to serve as an interface between a network element 102 and a transmission medium 112. Each network interface 108 may enable its associated network element 102 to communicate to other network elements 102 using any suitable circuit switched transmission protocol and/or standard. Network interface 108 and its various components may be implemented using hardware, software, or any combination thereof. For example, in certain embodiments, one or more network interfaces 108 may include a network interface card. In the same or alternative embodiments, one or more network interfaces 108 may include a line card.

Network 100 may implement any suitable redundancy scheme to provide redundancy for network 100 in the event of a fault or error occurring in network 100. For example, network 100 may implement bidirectional line switched ring (BLSR) protection. Using BLSR, traffic may be communicated in both a clockwise and counterclockwise direction, thus providing a redundant mechanism in the event failure of a network element or transmission medium 112 prevents forwarding of such traffic.

Modifications, additions, or omissions may be made to network 100 without departing from the scope of the disclosure. The components and elements of network 100 described may be integrated or separated according to particular needs. Moreover, the operations of network 100 may be performed by more, fewer, or other components.

FIG. 2 illustrates a flow chart of an example method 200 for reconfiguring an adjacent pair of network elements of a ring network for communication via packet switching, in accordance with certain embodiments of the present disclosure. According to some embodiments, method 200 may begin at step 202. As noted above, teachings of the present disclosure may be implemented in a variety of configurations of network 100. As such, the preferred initialization point for method 200 and the order of the steps 202-210 comprising method 200 may depend on the implementation chosen.

At step 202, network 100 may bridge traffic between network element 102a and network element 102d via a long path that traverses network elements 102b and 102c. To bridge the traffic network 100 may provision a path between network element 102a and network 102d through the path including network element 102b and network element 102c. Network elements 102b and 102c may be provisioned as pass-through nodes for such traffic. After the duplicate path is provisioned, network 100 may switch traffic from the short path to the newly-created long path.

At step 204, the transmission media 112 between network element 102a and network element 102d may be removed (e.g., manually by an individual, or automatically de-provisioned by one or more components of network 100), as indicated in FIG. 3.

At step 206, network 100 may provision packet switch-based network interfaces 308 (e.g., Ethernet network interfaces) on each of network element 102a and 102d, as shown in FIG. 3. A network interface 308 may include any suitable system, apparatus, or device configured to serve as an interface between a network element 102 and a transmission medium 112, 312. Each network interface 308 may enable its associated network element 102 to communicate to other network elements 102 using any suitable packet-switched transmission protocol and/or standard. Network interface 308 and its various components may be implemented using hardware, software, or any combination thereof. For example, in certain embodiments, one or more network interfaces 308 may include a network interface card. In the same or alternative embodiments, one or more network interfaces 308 may include a line card.

At step 208, transmission media 312 capable of carrying packet-switched traffic (e.g., Ethernet cable or optical fiber) may be added between network element 102a and network element 102d (e.g., manually by an individual, or automatically provisioned by one or more components of network 100), as indicated in FIG. 3.

At step 210, network 100 may switch traffic between the long path from network element 102a to network element 102d (e.g., through network elements 102b and 102c) to a packet-switched path between network elements 102a and 102d (e.g., via transmission media 312). To carry out such switch, may duplicate the circuit-switched path between elements 102a and 102d to a packet-switched path and delete the long path.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using network 100 or any other system operable to implement method 200. In certain embodiments, method 200 may be implemented partially or fully in software and/or firmware embodied in memory.

The various steps depicted in FIG. 2 may be repeated for other circuit switched-based spans between adjacent nodes. For example, in network 100, method 200 may be applied to the span between network element 102a and network element 102c, to the span between network element 102c and network element 102b, and to the span between network element 102b and network element 102d. In some embodiments, the span between adjacent nodes serving as a ring protection link 114 may be the last to be reconfigured in accordance with method 200, so that ring-based protection may remain during reconfiguration.

After all spans between adjacent pairs of network elements 102 have been reconfigured in accordance with method 200, network 100 may then be a packet-switched ring network with ring protection (e.g., a G.8032 Ethernet network). For example, one of the network elements 102 of the newly-configured packet-switched ring network 100 may be a ring protection link owner node that responds to R-APS signal fail messages to enable traffic to flow via a ring protection link thus providing redundancy to network 100. In such a scenario, one pair of bidirectional transmission media between adjacent nodes may be designated as a ring protection link 314. Ring protection link 314 may be employed to enable a shared ring protection scheme to provide redundancy for network 100. In typical operation, traffic may flow on all spans of transmission media 312 other than those making up ring protection link 314. In the event of a failure network element 102 or a transmission medium 312, ring protection link 314 may provide a redundant path for communication about network 100. For example, in the event of a failure of network element 102a, a path for communication between network element 102d and network element 102c may be provided via ring protection link 314.

A component of network 100 may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible computer readable storage media and may perform operations when executed by a computer. Certain logic, such as a processor, may manage the operation of a component. Examples of a processor include one or more computers, one or more microprocessors, one or more applications, and/or other logic.

A memory stores information. A memory may comprise one or more tangible, computer-readable, and/or computer-executable storage medium. Examples of memory include computer memory (for example, Random Access Memory (RAM) or Read Only Memory (ROM)), application specific integrated circuit (ASIC), field-programmable gate array (FPGA), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to network 100 without departing from the scope of the disclosure. The components of network 100 may be integrated or separated. Moreover, the operations of network 100 may be performed by more, fewer, or other components. Additionally, operations of network 100 may be performed using any suitable logic. As used in this document, "each" refers to each member of a set or each member of a subset of a set.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method for reconfiguration of a circuit-switched ring network to a packet-switched ring network comprising, for each adjacent pair of network elements in a network having a first circuit-switch path directly coupling the pair and communicating traffic between the pair:
    provisioning a second circuit-switched path indirectly coupling the pair via one or more intermediate network elements;
    switching the traffic from the first circuit switched-based path to the second circuit-switched path;
    provisioning packet switched-based network interfaces on each of the pair of network elements;
    establishing a packet switched-based path directly coupling the packet switched-based network interfaces; and
    switching traffic from the second circuit-switched path to the packet switched-based path.

2. A method according to claim 1, further comprising removing circuit switch-based transmission media coupled between the pair of network elements.

3. A method according to claim 2, wherein the circuit switch-based transmission media comprises optical fiber.

4. A method according to claim 1, further comprising adding packet switch-based transmission media between the pair of network elements.

5. A method according to claim 4, wherein the packet switch-based transmission media comprises one of Ethernet cable or optical fiber.

6. A method according to claim 1, wherein the circuit-switched ring network is a bidirectional line switched ring (BLSR) network.

7. A method according to claim 1, wherein the packet-switched ring network is a G.8032 network.

8. A method according to Claim 1, further comprising provisioning the one or more intermediate network elements as pass-through nodes for traffic between the pair of network elements.

9. A non-transitory computer-readable medium comprising logic for reconfiguring a circuit-switched ring network to a packet-switched ring network, the logic configured to, for each adjacent pair of network elements in a network having a first circuit-switch path directly coupling the pair and communicating traffic between the pair:
    provision a second circuit-switched path indirectly coupling the pair via one or more intermediate network elements;
    switch the traffic from the first circuit switched-based path to the second circuit-switched path;
    provision packet switched-based network interfaces on each of the pair of network elements;
    establish a packet switched-based path directly coupling the packet switched-based network interfaces; and
    switch traffic from the second circuit-switched path to the packet switched-based path.

10. The non-transitory computer-readable medium according to claim 9, wherein the logic is further configured to remove circuit switch-based transmission media coupled between the pair of network elements.

11. The non-transitory computer-readable medium according to claim 10, wherein the circuit switch-based transmission media comprises optical fiber.

12. The non-transitory computer-readable medium according to claim 9, wherein the logic is further configured to add packet switch-based transmission media between the pair of network elements.

13. The non-transitory computer-readable medium according to claim 12, wherein the packet switch-based transmission media comprises one of Ethernet cable or optical fiber.

14. The non-transitory computer-readable medium according to claim 9, wherein the circuit-switched ring network is a bidirectional line switched ring (BLSR) network.

15. The non-transitory computer-readable medium according to claim 9, wherein the packet-switched ring network is a G.8032 network.

16. The non-transitory computer-readable medium according to Claim 9, wherein the logic is further configured to provision the one or more intermediate network elements as pass-through nodes for traffic between the pair of network elements.

* * * * *